April 23, 1963  B. R. PLANCHE ETAL  3,087,133
ELECTROLYTIC CONTROL DEVICES
Filed April 24, 1961  3 Sheets-Sheet 2

INVENTORS
BENJAMIN RENÉ PLANCHE
MARCELLE PLANCHE
BY *Samuel L. Davidson*
ATTORNEY April 23, 1963 B. R. PLANCHE ETAL 3,087,133
ELECTROLYTIC CONTROL DEVICES
Filed April 24, 1961 3 Sheets-Sheet 3

INVENTORS
BENJAMIN RENÉ PLANCHE
MARCELLE PLANCHE

BY Samuel L. Davidson

ATTORNEY

United States Patent Office 3,087,133
Patented Apr. 23, 1963

3,087,133
ELECTROLYTIC CONTROL DEVICES
Benjamin René Planche and Marcelle Planche, Villefranche-sur-Saone, France, assignors, by mesne assignments, to Inventions Finance Corporation, a corporation of Delaware
Filed Apr. 24, 1961, Ser. No. 104,955
Claims priority, application France May 3, 1960
31 Claims. (Cl. 338—86)

This invention relates to electrolytic control devices, and more particularly to such devices of the type incorporating electrodes, an electrolyte, and an expandable gas medium for causing the electrolyte to submerge the electrodes for purposes of control.

Various electrolytic control devices have heretofore been suggested for use in controlling electrical devices, and specifically for use in automatically controlling the starting of an electric motor. The earlier devices of this type generally provided for utilizing a multi-chambered housing having electrodes and an electrolyte therein and, in addition, some form of pumping means driven by the device to be controlled and serving to cause displacement of the electrolyte in submerging relation to the electrodes. While such prior forms of electrolytic control devices, which are generally known in the art as "electrolytic rheostats" operated satisfactorily, the necessity of providing a fluid pumping means and a mechanical connection between the device to be controlled and the pumping means caused substantial inconvenience. Moreover, the provision of a pumping means inherently required incorporation in the rheostat of various moving parts of causing displacement of the electrolyte within the housing of the rheostat.

To overcome the disadvantages of the earlier constructions as outlined above, and in an endeavor to improve and simplify fabrication of electrolytic controls or rheostats, it was suggested in prior Planche French Patent No. 1,216,101 issued February 9, 1959, that an electrolytic rheostat construction be provided which utilized an expandable gas medium for purposes of causing displacement of the electrolyte. Expansion of the gas medium in the device of such prior patent is caused as a result of heating resistance means in response to operation of a motor being controlled, which resistance means are disposed in heat transfer relation with the expandable gas medium.

Although the construction presented in such prior French patent represents a substantial step forward in the art in that it eliminated the necessity for mechanical connections between the device being controlled and the electrolytic rheostat, and simplified overall construction of such rheostat, it did not provide the ultimate operational answer to the problem of replacing the pumping means of prior constructions with an expandable gas form of displacing operation.

Accordingly one of the primary objects of the present invention is to provide in combination with an electrolytic control device of the type utilizing electrodes, an electrolyte, and an expandable gas medium for causing the electrolyte to submerge the electrodes for purposes of control, certain improvements which render such device operational under varying conditions, and which insure against damage to any device being controlled should the same not function in accordance with a prescribed pattern.

A still further primary object of the present invention is to provide in an electrolytic control device operating in accordance with the preceding objects, and incorporating a unitary electrical switching means which functions in response to the level of submergence of the electrodes to cause simultaneously (a) maintenance of control conditions existent at a predetermined time, and (b) resetting of the electrolytic control device for another and subsequent control operation.

Yet, other, still further primary objects of the present invention are to provide an electrolytic control device as prescribed above, which incorporates means for compensating for atmospheric conditions, means for compensating for conditions resulting from malfunctioning of the device being controlled, and means for adjusting the operational speed and/or control characteristics of the electrolytic control device.

Still additional, yet more specific objects of the present invention are: (a) to provide an electrolytic control device conforming with the preceding objects and having separate chambers therein so disposed and arranged that expansion of a gas medium in one of the chambers causes displacement of electrolyte normally disposed in another of the chambers into still another chamber for purposes of submerging the control electrodes; (b) to provide such an electrolytic control device wherein resistance means adapted to be coupled with the device to be controlled are utilized for purposes of heating the expandable gas medium, and thus in turn to cause displacement of the electrolyte; (c) to provide such an electrolytic control wherein an electromagnetic relay means initially serves to establish initial electrical connections between the electrolytic control, the device being controlled, and the supply line, and then later serves to maintain static operating conditions, and simultaneously to cause resetting of the control device so that the same is ready for a repeat initial controlling operation; (d) to provide an electrolytic control device wherein the electromagnetic relay causes resetting of the device by disconnecting the electrical control components thereof from the supply line and device being controlled, and simultaneously causes mechanically venting of the expandable gas medium to the atmosphere whereby the expansion pressures are relieved, and the electrolyte returns to its initial confining chamber; (e) to provide such an electrolytic control device wherein the resistance means incorporated for purposes of heating the expandable medium comprises a plurality of resistance wires, and wherein means are incorporated for maintaining said wires taut at all times; (f) to provide an electrolytic control device as prescribed above wherein a float actuated switch is included for purposes of governing operations of the electromagnetic relay which functions as prescribed above; and (g) to provide an electrolytic control device conforming with all of the preceding objects which is readily adapted for various purposes including that of controlling the starting of an electric motor.

Briefly, and in its broadest aspects, the invention provides in combination with an electrolytic control device of the type utilizing electrodes, an electrolyte, and an expandable gas medium for causing the electrolyte to submerge the electrodes for purposes of control, the improvement comprising means operative in response to predetermined submergence of the electrodes for maintaining control conditions static regardless of the amount of submergence thereafter, and means for automatically venting the gas to the atmosphere in response to the predetermined submergence of the electrodes. The preferred embodiment of the invention, as suggested above utilizes as the means for maintaining control conditions static, electromagnetic switching means and means sensitive to the level of submergence of the electrodes for energizing the electromagnetic switching means. Moreover, the preferred construction incorporates a valve coupled to the electromagnetic switching means for operation thereby, which valve automatically exposes the expandable gas to the atmosphere. The electrolytic control device, moreover, includes a housing having at least three separate chambers therein and a series of conduits for effecting particular fluid communication paths between the various chambers.

The invention will be better understood, and objects other than those specifically set forth above will become apparent, when consideration is given to the following detailed description. Such description refers to the annexed drawings presenting preferred and illustrative embodiments of the invention. In the drawings.

General Construction

Figure 1:
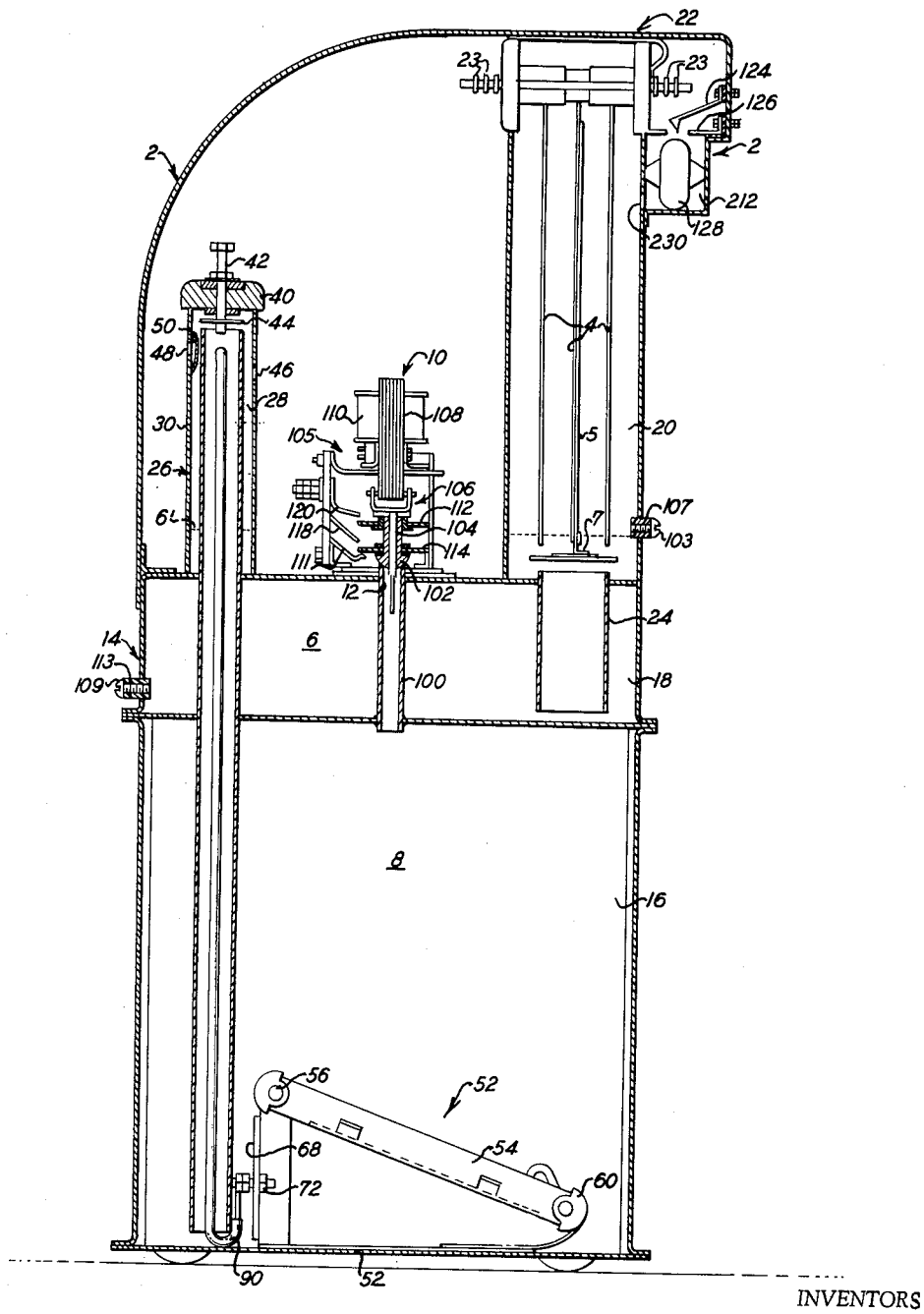
FIGURE 1 is a side view, partially in section, of an electrolytic control device constructed in accordance with the present invention.

In FIGURE 1, the electrolytic control device is generally designated by the numeral 2 and is shown as incorporating electrodes 4, an electrolyte 6, and an expandable gas medium 8 which, as explained below, causes the electrolyte 6 to submerge the electrodes 4 for purposes of control. In the device 2, there is incorporated means 10 which are operative in response to predetermined submergence of the electrodes for maintaining control conditions static regardless of the amount of electrode submergence thereafter, and means 12 for automatically venting the gas to the atmosphere in response to predetermined submergence of the electrodes.

All of the aforesaid means cooperate with the housing generally designated by the numeral 14 which is provided with a first chamber 16, a second chamber 18, and a third chamber 20. The electrodes 4 are mounted in the chamber 20 by means of any suitable mounting such as that designated by numeral 22, and are adapted to be coupled with the device to be controlled via connections 23. The body of electrolyte 6 is normally disposed in the second chamber 18, but as explained below, may be partially or totally displaced therefrom in response to expansion of the gas medium 8 which is disposed within the chamber 16.

The chamber 18 normally provides the only path of communication between the chamber 16 and the chamber 20. The chambers 20, 18 and 16 are disposed at different descending vertical levels as shown in FIGURE 1, and communication between chamber 18 and chamber 20 is provided by a conduit 24 extending between the chamber 20 and the lower portion of the chamber 18. Conduit means generally designated by the numeral 26 communicate the chamber 16 with the chamber 18 in such a manner that the body of electrolyte 6 is interposed the conduit means 26 and the conduit 24.

The conduit means 26 comprises an auxiliary chamber 28 formed by an elongated stand pipe 30 which is closed at one end, and which opens at the other end into the chamber 18. The conduit means 26 further comprises an elongated conduit 32 which extends from the bottom of chamber 16 through the chamber 6 and opens at its upper end into the chamber 28 provided by the conduit 30.

The upper end of conduit 30 is closed by a suitable insulating plate 40 having a screw plunger 42 cooperating therewith. The lower end of the screw plunger 42 carries a valve disc 44 which, upon rotation of the plunger 42, moves toward or away from the top opening in conduit 32. The plunger 42 and disc 44 carried thereon comprise means for controlling the flow of gas from the elongated conduit 32, as explained in more detail hereinbelow.

In addition to carrying the means for controlling the flow, described immediately above, the conduit 30 is provided with an aperture 46 in the side wall thereof which aperture serves as a means for balancing the pressure within the chamber 28 with atmospheric pressure. Moreover, the conduit 30 is provided with another and larger opening 48 in the opposite side wall thereof, and a flap or hinged membrane 50 cooperates with the opening 48. Normally, the membrane 50 closes the opening 48, however when the pressure within chamber 28 decreases below atmospheric pressure, the membrane opens the opening 48. The membrane may take any suitable form, and any suitable means may be used for hingedly securing the same with respect to the opening 48.

Heating Means

Figure 3:
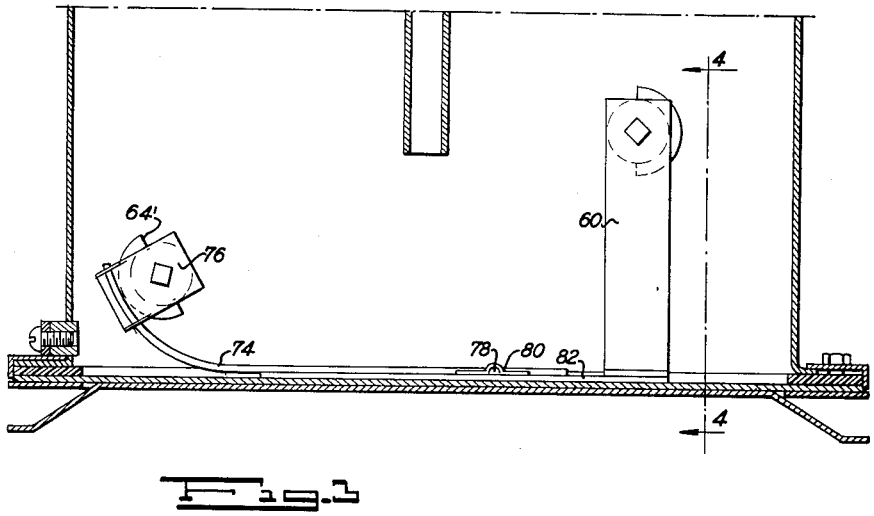
FIGURE 3 is a fragmental detailed side view presenting the preferred means incorporated in the device of FIGURE 1 for supporting resistance means used in accordance with the invention for heating an expandable gas medium.
Figure 4:
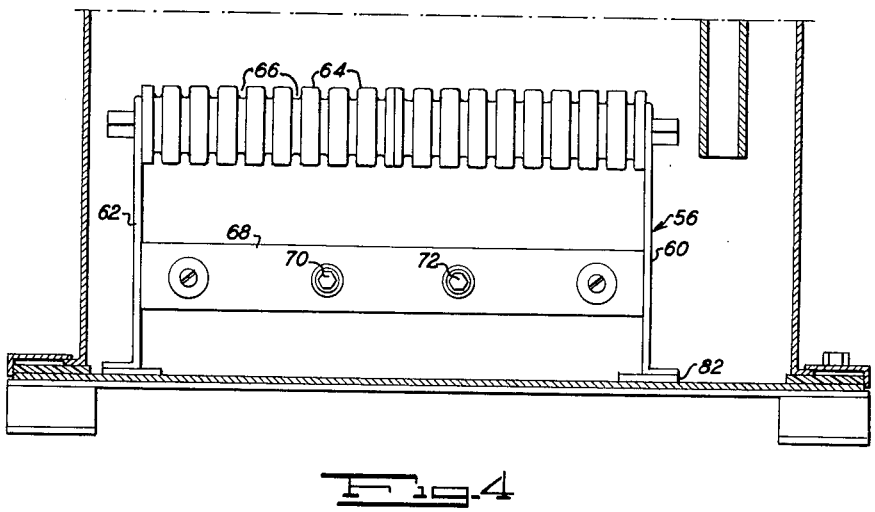
FIGURE 4 is an end view of the resistance support means shown in FIGURE 3.

Supported by the base 52 of the housing 14 is a means for heating the expandable gas within chamber 16. This means is generally designated by the numeral 52 and comprises a plurality of resistance wires 54 extending between spaced end supports 56 and 60. The support 56, as shown in FIGURE 4 comprises a pair of brackets 60 and 62 which serve to support therebetween a semi-cylindrical wire rack 64 having a plurality of grooves 66 therein. A transverse cross plate 68 extends between the upstanding legs of brackets 60 and 62 to support the same in spaced relation, and to provide a means for supporting the connecting terminals 70 and 72 with which the resistance wires are coupled. The support 60 takes generally the same form as the support 56, however the bracket means are eliminated, and in place thereof spring arms such as those designated by numeral 74 are provided. These arms support end brackets 76 between which a semi-cylindrical roller 64' is supported. The spring arms 74 are provided with laterally extending projecting lugs 78 that cooperate with a bracket 80 secured to a support bar 82 which extends forwardly of the bracket 60 as shown in FIGURE 3. It will be understood that a similar construction is provided on the opposite side to that shown in FIGURE 3 for support of the other end of the semi-cylindrical member 64'. As shown in FIGURE 1, an electrical cable 90 connects with the terminal 72, and in fact the terminal 70 also, and extends upwardly through the conduit 32 passing therefrom through a suitable opening in the side wall.

Means for Maintaining Conditions Static and Resetting

In addition to the conduits described hereinabove, the electrolytic control device 2 is provided with another conduit 100 which extends between the chamber 16 and the atmosphere. This conduit passes through the chamber 18 but does not open therein. The lower end of conduit 100 enters chamber 16 and remains exposed to the gases therein at all times. However, the upper end of conduit 100 is normally closed by a valve plug 102 which is carried at the lower end of a connecting rod 104 coupled through the yoke 106 with the reciprocating plunger 108 of an electromagnetic solenoid 110.

The plunger 108 of the solenoid, or more particularly the rod 104 coupled mechanically therewith, carries two conducting discs 112 and 114 which are adapted to cooperate with contacts 116, 118, and 120 to make and break connections so that a prescribed pattern of operation is achieved.

The electromagnetic solenoid 110 is electrically coupled with a switching means generally designated by the numeral 122. The switching means 122 comprises a pair of switch contacts 124 and 126 which are coupled together when a float 128 is caused to rise whereby the conducting central portion thereof establishes a connection between the contact 126 and the contact 124. The float is disposed in auxiliary chamber 212, and has insulating side arms 128, 128' which maintain the float positioned for reciprocation under the influence of the electrolyte.

*Operation*

Figure 5:
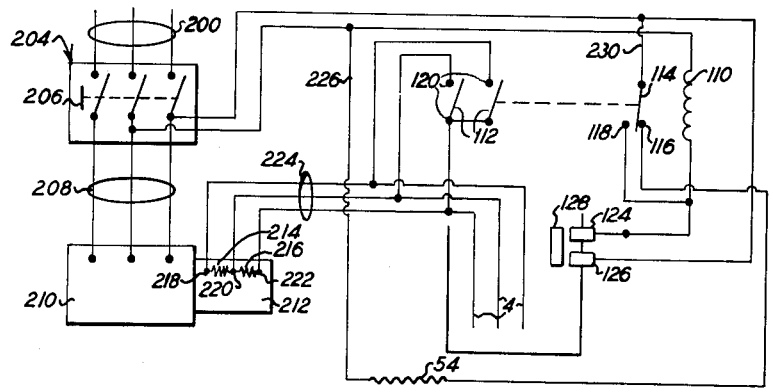
FIGURE 5 is a schematic circuit diagram presenting electrical connections made between the supply line, an electric motor, and the electrolytic control device provided in accordance with the present invention.

The operation of the electrolytic control device described hereinabove can be better understood if reference is first made to an exemplary circuit such as that presented in FIGURE 5. In this figure, a three phase input supply 200 is shown as being coupled with an input switching unit 204 having a mechanically actuated starting switch 206 therein. When the switch 206 is closed the supply line 200 is directly coupled via the lines 208 with an electrical device to be controlled such as a motor 210. In accordance with conventional practice, the motor is provided with a starting resistance box 212 having, for example, the resistances 214 and 216 therein coupled between terminals 218, 220, and 222 respectively. Leads 224 connect the terminals 218, 220, and 222 respectively with the electrodes 4.

The resistance wire 54 which serves to heat the expandable medium in chamber 16 is coupled across one phase of the input supply lines 200 by means of leads 226 and 230. Coupled in the lead 230 is a switch comprising the disc 114 and the contact 116.

When the switch 206 is initially operated to connect the supply line 200 with the input lines 208 to the motor 210, the disc 114 serves to connect the line 230 with the resistance 54. As a result the resistance 54 is heated.

If reference is now made to FIGURE 1, it will be noted that during this initial period, as the gas 8 is heated within chamber 16, the same is allowed to expand through the conduit 32 and into the chamber 28. Expansion of the gas in such manner results in presenting a pressure face 6' of the electrolyte 6. Continued expansion of the gas 8 causes the pressure face 6' to move downwardly due to the displacement of the electrolyte, which by virtue of the expansion is caused to move through the conduit 24 and into the chamber 20 submerging the electrodes 4.

The resistance 54 is heated in direct proportion to the current being drawn by the motor 210 by virtue of its connection directly across one phase of the supply lines passing thereto.

Initially, there is almost no conductivity between the electrodes 4, and resistances 214 and 216 are fully in circuit with the motor 210. Whatever resistance the electrodes 4 may have is coupled in parallel with the resistances 214 and 216. However, as the liquid rises within the chamber 20, the electrodes 4 become more and more submerged, and thus their effective resistance, if any is decreased progressively. When the liquid level reaches a predetermined point, the electrodes 4 are effectively short-circuited and thus, there is an effective short-circuit between the terminals 218 and 222 of the resistance box 212. In accordance with conventional practice, therefore, as the electrolytes rises with chamber 20, the starting resistances 214 and 216, and any resistance of the electrode 4 is effectively short-circuited.

Now if reference is again made to FIGURE 1, it will be noted that as the electrolyte rises within the chamber 20, it eventually reaches the inlet port 230 of the auxiliary chamber 232 wherein the float 128 is disposed. As the fluid enters chamber 230 it causes the float 128 to rise therein and thereby making contact between terminals 124 and 126.

By again referring to FIGURE 5, it will be noted that when the float 128 causes a connection between the terminals 124 and 126, the relay or coil 110 thereof shown in FIGURE 5 is coupled across the supply lines just as the resistance 54 was previously coupled thereacross. When this connection occurs, current passes through the relay coil 110 and causes operation of the solenoid plunger which, as previously explained, is coupled with the discs 112 and 114. As a result, the disc 114 is caused to break connection with the contact 116 and make connection with the contact 118. This latter connection maintains the relay coil coupled across one phase of the supply lines, and thus maintains the plunger thereof in a position with the disc 114 connected to the terminal 118. After such connection is made the float 128 can descend within its own auxiliary chamber without affecting the operating conditions. It will be understood that short-circuiting of electrodes 4 occurs when the electrolyte reaches the predetermined level where float 128 causes connection between contacts 124 and 126.

Simultaneously with movement of the disc 114 into contact with terminal 118 as described above, the disc 112 moves into contact with the terminals 120. The "disc" switch is presented schematically in FIGURE 5, but it will be understood that a single disc 112 can be used which moves upwardly engaging three contact arms 120 spaced apart by 120°, for example. When the disc 112 engages the contact arms 120, then such contact arms are effectively coupled directly together. This means that a short-circuit is established across the leads 224, and that the short-circuiting across such leads previously caused by the electrolyte short-circuiting the electrodes 4, is maintained even though the electrolyte may thereafter flow out of the chamber 20 and back to its initial position in the chamber 6.

It was explained above that the plug 102 which cooperates with the upper end of conduit 100 is directly coupled with the plunger 108 of the solenoid 110. By virtue of this coupling, when the solenoid is energized to make and break the contacts as described in the immediately preceding paragraphs, the plunger head 102 rises therewith, thereby opening the upper end of the conduit 100 and allowing the atmosphere to pass into the chamber 16, or alternatively thereby equalizing the temperature and pressures of gas within the chamber 16 with atmospheric temperatures and pressures. With this equalization, the pressures previously presented to the electrolyte 6 are removed, and the same drains back to the initial position.

From the foregoing description it should be apparent that the solenoid means is operative in response to predetermined submergence of the electrodes for maintaining control conditions static regardless of the amount of submergence thereafter, and that the conduit 100 and cooperating plug 102 serve as a means for automatically venting the gas within the chamber 16 to the atmosphere in response to predetermined submergence of the electrodes.

Once the pressure within the chamber 16 has been equalized by opening of the upper end of the conduit 100, and the electrolyte has returned to its initial position, then the device is ready for a repeat operation. It will not perform such repeat operation, however, because the solenoid remains energized so as to maintain control conditions static until the switch 206 is opened.

It will be understood that the ascendial speed of the electrolyte 6 within the chamber 20, as well as the duration of the control can be adjusted by rotating the plunger 42 carrying the valve disc 44 thereon so as to control the flow from conduit 32 into chamber 28, and so as to thereby control the pressures exerted on the electrolyte 6. It will also be understood that when the main circuit switch 206 is opened, the relay coil 110 is deenergized, and the discs 112 and 114 return to their initial positions, the relay plunger 108 descending under the action of gravity.

By virtue of the provision of the aperture 46 in the side wall of the conduit 30, the internal pressure within chamber 28 is balanced against the external or atmospheric pressure. This prevents pressure variations which would hinder the movement of liquid on account of the temperature differences between day and night or summer and winter.

The larger opening 48 in the wall of conduit 30, which is normally covered by the membrane 50, is provided so as to insure against passage of electrolyte 6 into or through the conduit 32. In the event of a rapid sequence of motor starts for example, the control device 2 may tend to overheat so that the air within the chamber 16 would remain relatively expanded. In this event, should the rheostat stop, the air would contract while cooling and the electrolyte 6 would tend to rise in the chamber 28 and pass into the conduit 32. This is prevented, since whenever the pressure within chamber 28 is lower than the atmospheric pressure, the membrane 50 swings inwardly opening the chamber 28 to the atmosphere.

Detailed Structural Considerations

Although no particular mention has been made of the specific form of electrodes 4, it will be understood that these electrodes may take any suitable form such as described in prior Planche U.S. Patent No. 1,885,373, prior Planche U.S. Patent No. 1,966,804 or prior Planche French Patent No. 1,216,101. Similarly, the electrolyte used may be any suitable type described in such previous patents.

Preferably the central electrode 4 carries a non-conducting support arm 5 which carries at the lower end thereof a fluid distributing plate 7. The plate 7 insures uniform circulation of electrolyte into chamber 20 and prevents surging.

Filling of the housing, or more particularly chamber 6, with electrolyte is accomplished by removal of screw 103 from the inlet plug 107 in the right side wall of chamber 20, and draining of electrolyte from the housing is achieved by removing screw 109 from drain plug 113 from the left side wall of chamber 6.

Any suitable means may be used for connecting the various walls together, or for coupling supports thereto. Moreover, the frame 105 which is provided for support of solenoid 110, plunger 104, and contacts 116, 118 and 120 can take any form desired. It is important, however, that plug 102 be made of an insulating material with the construction shown, since it supports discs 112 and 114, and these discs make separate electrical connections.

Modifications

Figure 2:
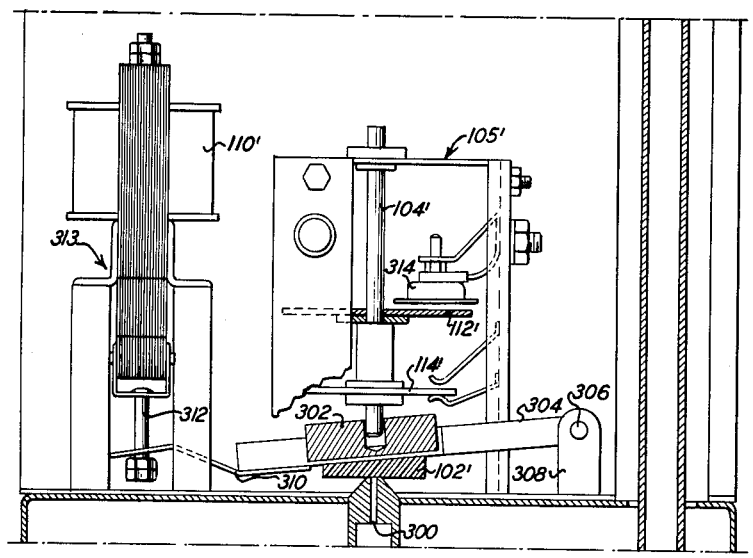
FIGURE 2 is also a side view, partially in section, of a portion of the device shown in FIGURE 1, FIGURE 2 presenting in some detail a modified form of electromagnetic switching means adapted to be utilized in an electrolytic control construction in accordance with the present invention.

Although the solenoid actuated switching means and valve generally designated by the numerals 10 and 12 in FIGURE 1 serve to provide for satisfactory operation of the improved electrolytic control provided hereby, certain improved results can be obtained with the modified form of assembly shown in FIGURE 2. In this FIGURE, the conduit 100 is replaced by the conduit 100' which is provided with a small outlet passageway 300 at the upper end thereof. This passageway cooperates with a flexible and resilient stopper member 102' carried by a weight member 302. The weight member 302 is supported on an arm 304 which is pivoted about the shaft 306 extending between a pair of suitable brackets 308. The end of the arm 304 remote from the pivotal shaft 306 carries an actuating fork member 310, the free end of which engages or passes about the plunger shaft 312 of the solenoid 110'.

With this modified construction, when the solenoid 110' is actuated the plunger shaft 312 thereof is lifted, thus causing the link or fork member 310 to move upwardly so as to pivot the arm 304 about the axis 306. Such pivoting results in raising the resilient member or stopper 102' from closing relationship with the outlet passageway 300 whereby the conduit 100' communicates the chamber 16 with the atmosphere. It will be noted that as the arm 304 pivots in the manner explained, the weight member 302 engages the lower end of a reciprocal shaft 104' reciprocally mounted in frame 105. The shaft 104' carries thereon the contacting discs 114' and 112' corresponding with the similar discs 112 and 114 shown in FIGURE 1. The contacting arrangement is essentially the same as that described above, except in place of the arcuately spaced contacts 120, there is provided a single triple contacting head 314 which is engaged by the disc member 112 upon upward movement thereof.

With the construction shown in FIGURE 2 there is a more positive closing of the conduit 100' by virtue of the weight member applying through the action of gravity, and increased force on the flexible closure 102'. Moreover, by providing the solenoid 110' laterally of the moving contacting members, there is a certain degree of ease in fabrication. Notwithstanding these factors, however, the principle of operation is exactly the same, as should be readily apparent to those of ordinary skill in the art.

The particular support structure provided for solenoid 110' forms no part of the present invention, but it will be understood that a suitable frame such as that generally designated by numeral 313 is preferably utilized so as to insure free reciprocal movement of arm 312.

Conclusion

While we have described the preferred embodiments of our invention in great detail hereinabove, various modifications, other than those specifically set forth above, may occur to those of ordinary skill in the art after reading the detailed description. Accordingly, what is claimed is:

1. In combination with an electrolytic control device of the type utilizing electrodes, an electrolyte and an expandable gas medium for causing the electrolyte to submerge the electrodes for purposes of control, the improvement comprising means operative in response to predetermined submergence of said electrodes for maintaining control conditions static, and means comprising duct means including means operatively associated therewith for automatically exposing said gas to the atmosphere in response to said predetermined submergence of said electrodes.

2. The improvement defined in claim 1 wherein said means for maintaining control conditions static comprises electromagnetic switching means, and means sensitive to the level of submergence of said electrodes for energizing said electromagnetic switching means.

3. The improvement defined in claim 2 wherein said means for automatically exposing said gas in the atmosphere includes a valve coupled to said electromagnetic switching means for operation thereby.

4. The improvement defined in claim 3 wherein said valve comprises a conduit communicating with said medium, and a closure for said conduit, and wherein said electromagnetic switching means includes a reciprocating member mechanically coupled to said closure.

5. The improvement defined in claim 3 wherein said means sensitive to the level of submergence comprises a float actuated switch.

6. For use in governing operation of an electrical device, an electrolytic control comprising, in combination, a housing having first, second and third chambers therein, electrodes adapted to be coupled with the device and mounted in the first chamber, a body of electrolytic fluid disposed in the second chamber, a heat expandable gas disposed in the third chamber, said second chamber normally providing the only path of communication between said first and third chambers, conduit means providing the only path of communication between said first and second chambers, and means for heating said gas to expand the same in response to operation of the electrical device whereby said gas acts on said fluid to cause said fluid to flow into said first chamber and submerge said electrodes.

7. An electrolytic control as defined in claim 6 wherein said first, second and third chambers are disposed at different descending vertical levels respectively, and wherein said conduit means extends between said first chamber and the lower portion of said second chamber, said control further including conduit means communicating said third chamber and said second chamber with said body of electrolyte interposed the entries of said conduit means in said second chamber.

8. An electrolytic control as defined in claim 7 wherein said conduit means communicating said second and third chambers comprises an elongate auxiliary chamber closed at one end and opening at the other end into said second chamber, and an elongated conduit opening at one end into said auxiliary chamber, and opening at the other end into said third chamber.

9. An electrolytic control as defined in claim 8 wherein said auxiliary chamber carries means thereon for controlling flow of gas from said elongated conduit opening therein.

10. An electrolytic control as defined in claim 9 wherein said means for controlling flow comprises a reciprocal plunger cooperating with the end of said elongated conduit opening in said auxiliary chamber.

11. An electrolytic control as defined in claim 10 wherein said auxiliary chamber is provided with means for balancing the pressure within said chamber with atmospheric pressure.

12. An electrolytic control as defined in claim 10 wherein said auxiliary chamber is provided with means for automatically opening said auxiliary chamber to the atmosphere in response to a decrease in pressure therein below atmospheric pressure.

13. An electrolytic control as defined in claim 10 wherein said auxiliary chamber is provided with an aperture in the wall thereof for balancing the pressure within said chamber with atmospheric pressure, a valve comprising an opening in the wall of said auxiliary chamber and a hinged membrane normally sealing said opening, said valve automatically opening said auxiliary chamber to the atmosphere in response to a decrease in pressure therein below atmospheric pressure.

14. An electrolytic control as defined in claim 10 wherein said means for heating said gas to expand the same comprises resistance wire, and means for supporting said wire in stretched condition.

15. An electrolytic control as defined in claim 14 wherein said means for supporting said wire in stretched condition comprises spaced refractory supports, and means for urging one of said supports away from the other.

16. In an electrolytic control for use in operating electrical equipment, and of the type comprising a plurality of separate chambers, conducting electrodes disposed in at least one of said chambers, and adapted to be coupled to the equipment, and a body of electrolyte carried in another of said chambers communicating with said one chamber, the improvement comprising separate chamber means for confining a heat expandable medium in pressure transfer relation to said body of electrolyte, means for heating said expandable medium in said separate chamber means in response to operation of the equipment being controlled to cause expansion of said medium, means for transferring the expansion pressures of said medium to said body of electrolyte to displace said body into said one chamber and thereby submerge said electrodes therein, means operative in response to predetermined submergence of said electrodes for maintaining control conditions static during any given operation regardless of the degree of submergence of said electrodes thereafter, and means for automatically exposing said medium to the atmosphere in said one chamber in response to said predetermined submergence.

17. The improvement defined in claim 16 wherein said means for maintaining control conditions static comprises an electromagnetic switching means, and means responsive to a predetermined level of submergence of said electrodes for energizing said switching means, wherein said means for confining comprises still another of said chambers, wherein said means for automatically exposing said medium to the atmosphere comprises a valve communicating with said still other chamber, and wherein said valve is actuated by said switching means.

18. The improvement defined in claim 17 wherein said electromagnetic switching means comprises a solenoid, and a plunger reciprocal under the action thereof, and wherein said means responsive to a predetermined level of submergences comprises a float actuated switch coupled in circuit with said solenoid for energization thereof.

19. The improvement defined in claim 18 wherein said switching means includes stationary contacts and contacts carried by said plunger cooperating with said stationary contacts.

20. The improvement defined in claim 19 wherein said contacts are coupled to said electrodes to short circuit said electrodes upon energization of said solenoid.

21. The improvement defined in claim 20 wherein said contacts of switching means are coupled with said means for heating to disconnect the same upon energization of said solenoid.

22. The improvement defined in claim 21 wherein said contacts of said switching means are coupled with said solenoid to maintain the same energized after initial energization thereof by said float actuated switch.

23. In combination with an electrolytic control device of the type utilizing electrodes, an electrolyte and an expandable gas medium for causing the electrolyte to submerge the electrodes for purposes of control, the improvement comprising means operative in response to predetermined submergence of said electrodes for maintaining control conditions static and resetting said device for another operation, said means operative in response to predetermined submergence comprising an electromatic solenoid means, valve means for communicating said medium with the atmosphere and coupled to said solenoid means for operation thereby, and switching means operative with said solenoid means.

24. The improvement defined in claim 23 wherein said switching means is carried by a frame and includes a plunger reciprocal therein, wherein said valve means is operative by said plunger, and wherein said solenoid means is suported laterally of said frame and coupled to said plunger by a pivotal link for reciprocating said plunger in response to operation of said solenoid.

25. In an electrolytic rheostat having separate chambers and submersible resistance electrodes; electrolyte in one of said chambers for submerging said electrodes, a gas in a second separate chamber for controlling said electrolyte and heating means including switch means therefor closed by the submerging of said electrodes to expand said gas to submerge said electrodes, the improvement comprising: means including means responsive to a predetermined submergence of said electrodes due to expansion of said gas for venting said gas from said second chamber to the atmosphere whereby to effect withdrawal of said electrolyte from said electrodes while said switch means remains closed.

26. The improvement defined in claim 25 in which said means responsive to a predetermined submergence of said electrodes comprises a float controlled switch for sensing said predetermined submergence, said means comprising a valve responsive to said switch means for venting said gas to the atmosphere.

27. An electrolytic rheostat comprising: first, second and third separate chambers; resistance electrodes mounted in said first chamber; a body of electrolyte in said second chamber, a heat expandable gas and means for heating said gas in said third separate chamber; an electrolyte conducting channel limiting flow of electrolyte to said first and second chambers and a gas conducting channel limiting flow of gas to said second and third chambers.

28. A rheostat according to claim 27 including means for venting said third chamber to the atmosphere upon attainment of a predetermined submergence of said electrodes in said electrolyte.

29. A rheostat according to claim 27 wherein said gas conducting channel comprises a duct connecting said second and third chambers and means in said duct responsive to subatmospheric pressure in either of said chambers for connecting said duct to the atmosphere.

30. A rheostat according to claim 27 in which said first chamber is vertically above said second chamber and said second chamber is vertically above said third chamber, said gas conducting channel being mounted to extend in said first, second and third chamber.

31. A rheostat according to claim 30 including means for venting said third chamber to the atmosphere upon attainment of a predetermined submergence of said electrodes in said electrolyte.

References Cited in the file of this patent
FOREIGN PATENTS 1,216,101    France _____ Nov. 23, 1959